UNITED STATES PATENT OFFICE.

ROBERT WAHL, OF CHICAGO, ILLINOIS.

MANUFACTURE OF MALT.

1,068,028. Specification of Letters Patent. Patented July 22, 1913.

No Drawing. Application filed May 26, 1913. Serial No. 770,032.

*To all whom it may concern:*

Be it known that I, ROBERT WAHL, a citizen of the United States, residing at Chicago, in the county of Cook and State of Illinois, have invented a new and useful Improvement in the Manufacture of Malt, of which the following is a specification.

My invention relates to an improvement in treating malt, in the process of manufacturing it, whether made from barley, rye, wheat, oats, or any other suitable cereal; the primary objects of my improvement being to render more uniform and to expedite the growing thereof, to reduce the malting-loss, and to materially increase its diastatic and peptic strength.

The present improvement has been more especially devised by me for the treatment of barley malt, and therefore, but without intending that it shall be understood in any way to be limited thereto, the description hereinafter contained is mainly directed to the treatment of malt in the process of manufacturing it from barley, by steeping and germinating it and finally kiln-drying the germinated product.

My invention consists, broadly, in treating the cereal, during the procedure of manufacturing it into malt, with a liquid soured by lactic acid propagated therein or with an acidulated liquor containing lactic acid bacteria cultivated or propagated therein.

I have discovered that malt treated in accordance with my present improvement acts similarly to the bacterial lactic acid added to the brewer's mash according to my Patent No. 1,023,448, whereby the added lactic acid lends zest to the beer, and exerts a stimulating effect upon the peptase of the malt, enhancing the thoroughness of its digestive action on the albuminoids and so modifying them as to cause coagulable albuminoids to be more effectively thrown out in boiling the wort and the remainder to be agglutinated and precipitated out of the beer by the cold temperatures to which it is subjected in the storing and finishing casks and in the processes of Kraeusening, clarifying with isinglass, and other procedures it undergoes in the manufacture. I find that lactic acid exercises a similar influence on the albuminoids of malt in the growing thereof; that is to say, it causes a digestive action during the germinating period, and, besides, the lactic acid inverts the basic phosphates contained in the endosperm of the cereal as it gradually changes to malt in the germinating process. As is well known, when the barley embryo or germ begins to grow, it needs for food, sugar, amido bodies and phosphates, the latter largely in the form of phosphates of potash; but the endosperm contains no sugar, nor amido bodies in any material quantity, and no soluble phosphates. During the germination, therefore, the starch must be inverted into sugar, the albumen substances contained in the endosperm into amido bodies, and the basic phosphates into soluble phosphates. The inversion of the starch is accomplished by diastase, that of the albumen by peptase, and that of the insoluble phosphates directly by the lactic acid. The lactic acid, however, as already stated, exerts indirectly, a digestive action, the peptase, as it is generated, being tied up with an albumen base, itself acting like an acid radical; and the lactic acid unites with this albumen base, setting free the peptase to enable it to exercise its digestive powers upon the albumen.

By my improved treatment of the cereal in malting it, the lactic acid and the lactic acid bacteria supplied thereto become incorporated with the malt, whereby the latter, when used in the manufacture of a malt beverage, is adapted, by reason of its content of lactic acid and of lactic acid bacteria, to act similarly to the action described in my aforesaid patent of the liquor acidulated with lactic acid propagated therein when added to the matter under treatment. This effect of the lactic acid and of the lactic acid bacteria may be partially accomplished toward this same end during the germinating or growth of the malt.

To practise my improvement, the preferred procedure is the following: The barley to be malted should be carefully washed, before steeping it, to remove the various bacteria, which adhere to the husk of the cereal and start to grow in the steeping step, including lactic acid bacteria as well as other organisms, of which there may be many kinds, some of which may be injurious, like mold-spores. I prepare a mash by mixing malt-sprouts with water, using, by weight, about 20 to 50 parts of the sprouts to about 1,000 parts of water, and heat the mash to 50° C., or thereabout, whereupon it is inoculated with the proper type of lactic acid bacteria. After inoculation, the mash is held at a temperature of between 50° C. and 45° C., or thereabout, until the desired extent of acidulation is attained. I prefer to prepare this sour liquor in accordance with the process set forth in my Patent No. 1,028,508. Of this liquor I add enough to the steeping-water, whether it be the first, second, third or fourth steeping-water, to attain acidulation thereof to the extent of about .01 to .1 per cent.; or the liquor may be used instead of the sprinkling water by sprinkling it on the cereal while growing, after the third or fourth day, or just prior to transferring it to the kiln, or even while it is undergoing the kiln operation, and this whether or not the liquor has also been added during the steeping stage. By preference, however, I add the liquor in the steep.

To cite a concrete example of the advantages, as regards peptic or diastatic strength, of my present process, in employing dilute bacterial lactic acid liquor for the treatment of barley at any stage of the malting thereof, the following comparative analysis is given, the same being taken from a series of experiments which I have conducted. In column I will be found the values obtained where the barley is steeped and is malted in the customary manner; and column II gives the findings on a portion of the same barley, which has been malted in precisely the same manner except for treating it with 0.05 per cent. of the lactic-acid liquor, the liquor, in this instance, having been applied in the steeps:

| Sample. | I. | II. |
| --- | --- | --- |
| Moisture | 5.80 per cent. | 6.20 per cent. |
| Diastatic strength (Lintner value) | 172° L. | 191° L. |
| Peptic strength | 22 Min. | 26 Min. |
| Mellowness | Good. | Good. |

In view of the fact that sample No. 2 contains the larger per cent. of moisture and would therefore be expected to have, if anything, a lower diastatic strength, the results shown by the foregoing example are quite significant. The determination of the peptic strengths was made according to a modification of the P. Schidrowitz method (*J. Fed. Inst. Brg.* 9, 361–382) set forth in detail on page 220, vol. 14, *Original Communications Eighth International Congress of Applied Chemistry*, in my article on "Further Research on the Proteolytic Enzyme of Malt."

The following comparative table of the analyses of cold-water extracts of a normal malt and an extremely acid malt, each prepared by extracting 1 part by weight of finely-ground malt with 5 parts by weight of water for one-half an hour at room temperature (22° C.), serves to show the nature of the influence of the bacterial acidity on the malt:

|  | Normal malt. | Acid malt. |
| --- | --- | --- |
| Specific gravity | 1.0148 | 1.0230 |
| Balling | 3.7 per cent. | 5.75 per cent. |
| Free lactic acid | 0.009 " | 0.09 " |
| $P_2O_5$ | 0.07 " | 0.08 " |
| Total acid | 0.144 " | 0.543 " |
| Total albumen | 0.651 " | 1.33 " |
| Coagulable albumen | 0.187 " | 0.016 " |
| Non-coagulable albumen | 0.464 " | 1.314 " |

As will be noted, the yield of the acid malt is considerably higher than that of the normal malt, as is also the content of phosphates and of total albumen. While the water extract of the normal malt contains an appreciable per cent. of coagulable albumen, the acid malt contains practically none. Deducting from the large amount of total albumen found in the acid malt the acid albumen which is precipitated on neutralization, still leaves a far greater percentage of soluble and non-coagulable albumen in the acid malt, which is attributable to the action of the peptic enzym set free by the action of the bacterial acid. The acid malt in the foregoing example, of course, represents a case of extreme acidity and has been taken merely to demonstrate the possibilities of my invention, but similar, though less extensive changes occur where the quantities of the acid the malt are smaller, as is the case in practice. My improvement permits these important changes to be readily controlled. The benefits derived from my treatment of the malt in the process of its manufacture will be understood to be due to the lactic acid and the bacteria being drawn into the interior of the barley with the water, while the bacteria thus introduced continue their growth and the production of lactic acid. The reason why more free lactic acid is not found in the germinating malt is that it is used up in activating the peptase and inverting the basic phosphates to primary or acid phosphates.

The following are given as the more important advantages of my invention: its effect in producing an earlier start in the growth of the malt and expediting the growth; the stimulating effect of the acid on the digestive properties of the peptase and the inversion of the basic phosphates into acid phosphates, these two last-named advantages, when malt treated with my process is used in the mash-tun in making beer, continuing therein, since the malt has relatively-high peptic strength and contains a relatively-large quantity of inverted phosphates; the increase of the peptic action in mashing; the obtainment of larger quantities of phosphates than are obtainable in mashing according to present practices in brewing, (wherein much of the phosphates enter the grains as insoluble matter and are lost for the brewing purpose), therefore resulting in a yield considerably increased; and its health lending property to the malt, since the lactic acid introduced into it exerts a decided germicidal effect on other foreign organisms, thereby rendering the product cleaner biologically, besides, the lactic acid has a decidedly bleaching effect on the malt, so that the product is much lighter in color. Moreover, the culture lactic-acid bacteria contained in malt treated in accordance with my improvement, which are not destroyed by the kilning treatment to which the malt is subjected, but remain in an inert and dry condition therein, are revived in the mash-tun and participate in the peptonization of the mash, taking the place of the promiscuous flora which inhabit the malt as it is manufactured under present practices.

What I claim as new and desire to secure by Letters Patent is—

1. In manufacturing malt, adding thereto lactic acid during a stage of the manufacture.

2. In manufacturing malt, adding thereto, during a stage of the manufacture, a liquor containing a culture of lactic-acid bacteria.

3. In manufacturing malt, adding, during a stage of the manufacture, a culture of lactic-acid bacteria in a liquor soured by lactic-acid bacteria propagated therein.

4. In manufacturing malt, the process which consists in first cleansing the husks of the cereal of foreign organisms adhering thereto, and adding, during a stage of the manufacture, a liquor containing a culture of lactic-acid bacteria.

5. In manufacturing malt, the process which consists in first cleansing the husks of the cereal of foreign organisms adhering thereto, and adding during a stage of the manufacture a culture of lactic-acid bacteria in a liquor soured by lactic-acid bacteria propagated therein.

6. In manufacturing malt, adding during the steeping-stage of the manufacture a culture of lactic-acid bacteria in a liquor soured by lactic-acid bacteria propagated therein.

7. In manufacturing malt, the process which consists in first cleansing the husks of the cereal of foreign organisms adhering thereto and adding during the steeping-stage of the manufacture a culture of lactic-acid bacteria in a liquor soured by lactic-acid bacteria propagated therein.

8. In manufacturing malt, adding during the steeping-stage of the manufacture and also during a subsequent stage thereof a culture of lactic-acid bacteria in a liquor soured by lactic-acid bacteria propagated therein.

ROBERT WAHL.

In presence of—
NELLIE B. DEARBORN,
A. C. FISCHER.